United States Patent [19]

Clark

[11] Patent Number: 5,132,672
[45] Date of Patent: * Jul. 21, 1992

[54] THREE DEGREE OF FREEDOM GRAPHIC OBJECT CONTROLLER

[75] Inventor: Michael R. Clark, Glendale, Calif.

[73] Assignee: Apple Computer, Inc., Cupertino, Calif.

[*] Notice: The portion of the term of this patent subsequent to Mar. 10, 2009 has been disclaimed.

[21] Appl. No.: 560,713

[22] Filed: Jul. 13, 1990

Related U.S. Application Data

[62] Division of Ser. No. 499,931, Mar. 27, 1990, Pat. No. 5,095,303.

[51] Int. Cl.⁵ .............................................. G09G 3/02
[52] U.S. Cl. ..................................... 340/710; 340/709
[58] Field of Search .................... 340/709, 710, 706; 273/148 B; 74/417 XY, 471 R

[56] References Cited

U.S. PATENT DOCUMENTS

| | | | |
|---|---|---|---|
| 4,562,347 | 12/1985 | Hovey et al. | 340/710 |
| 4,692,756 | 9/1987 | Clark | 340/709 |
| 4,766,423 | 8/1988 | Ono et al. | 340/709 |
| 4,808,979 | 2/1989 | DeHoff et al. | 340/709 |
| 4,812,829 | 3/1989 | Ebina et al. | 340/709 |
| 4,835,528 | 5/1989 | Flinchbaugh | 340/709 |
| 4,933,670 | 6/1990 | Wislocki | 340/709 |
| 4,987,527 | 1/1991 | Hamada et al. | 340/709 |

OTHER PUBLICATIONS

Leon, "Thumbwheel Positional Control Unit," IBM Technical Disclosure Bulletin, vol. 21, No. 7, Dec. 1978, pp. 3026–3027.

*Primary Examiner*—Jeffery A. Brier
*Assistant Examiner*—Xiao Min
*Attorney, Agent, or Firm*—Timothy Casey

[57] ABSTRACT

A three degrees of freedom interactive display controller device is disclosed, comprising a hand manipulable housing unit having an opening for the passage of a mouse ball, two motion detectors for detecting the movement of the mouse ball and converting that motion to output signals controlling the translational movement of an object on the display of a computer and a finger operated conveyor belt or roller for controlling the translational motion of the object with respect to a third translational axis. All translation controls are operable to be physically moved in a direction which corresponds to the desired simulated direction of movement of the object on the display. The physical motion of each control is unbounded and the actual physical position of the housing unit is independent of the simulated position of the object on the display.

12 Claims, 3 Drawing Sheets

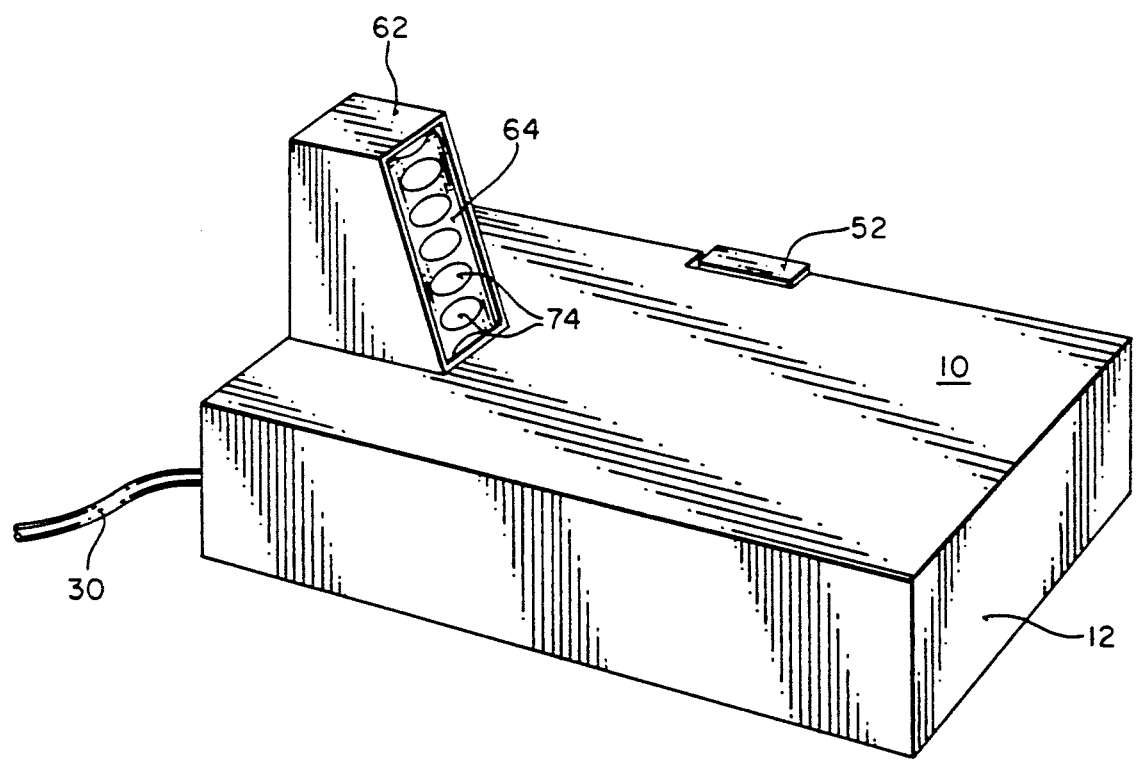
FIG _ 1

FIG_2
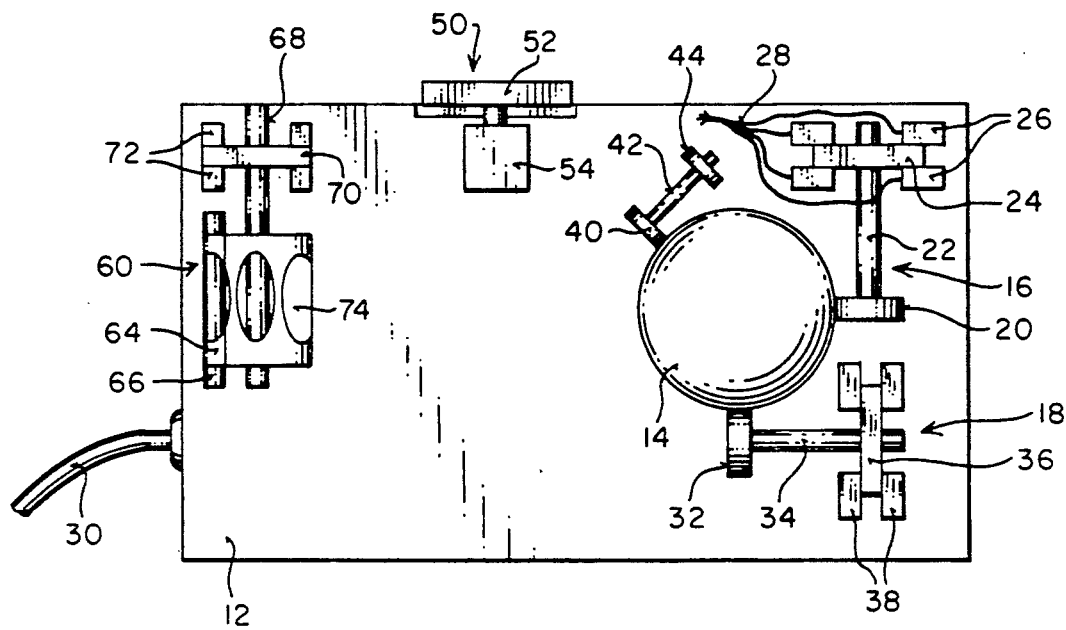
FIG_3
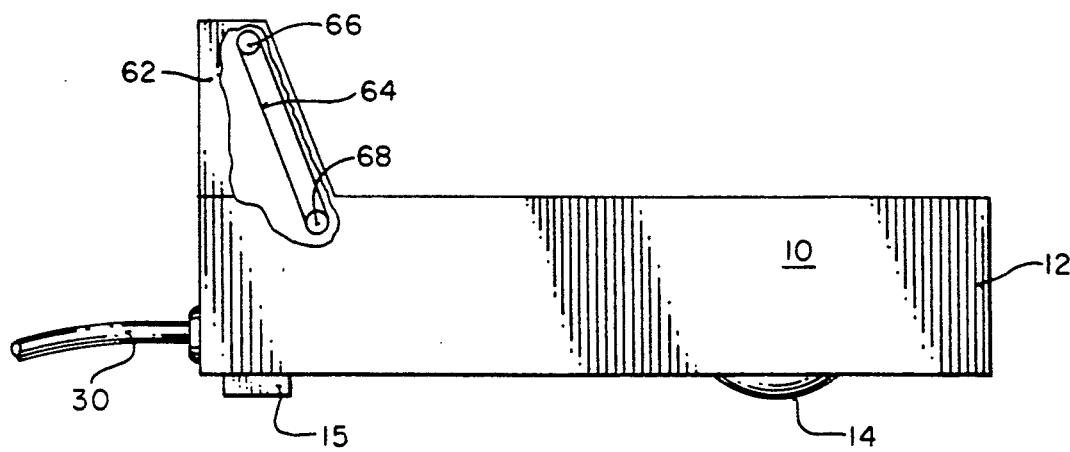

FIG_4
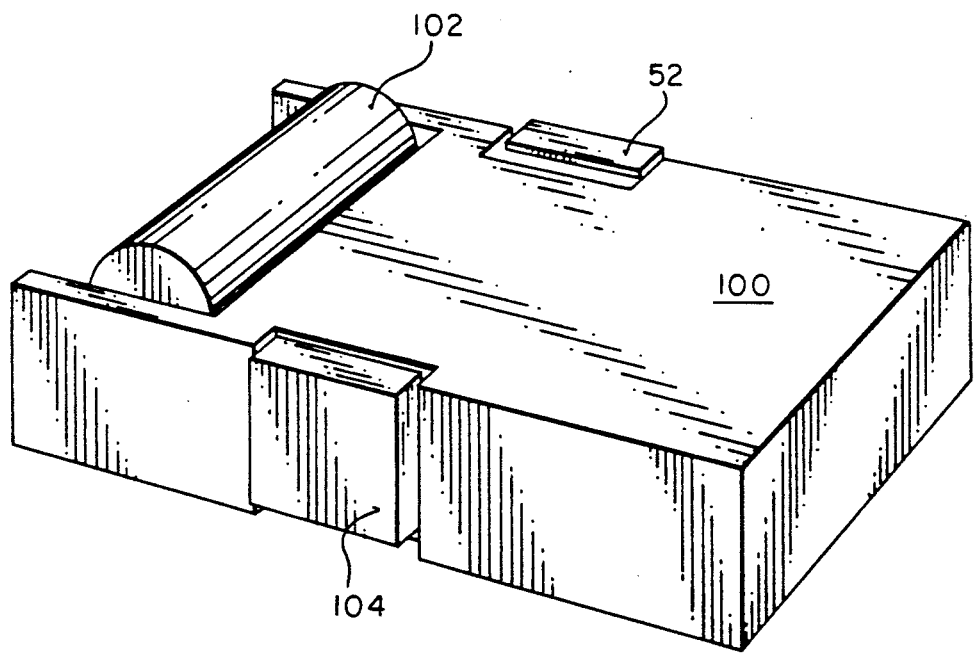

THREE DEGREE OF FREEDOM GRAPHIC OBJECT CONTROLLER

This application is a division of application Ser. No. 07/499,931, filed Mar. 27, 1990, now U.S. Pat. No. 5,095,303.

FIELD OF THE INVENTION

The present invention relates generally to control devices for manipulating the position of objects on the display of a computer system, and more particularly to an improved control device for manipulating such objects in at least three degrees of freedom.

BRIEF DESCRIPTION OF PRIOR ART

Many computers, when equipped with sufficient memory and appropriate software, are capable of generating images of three dimensional objects. Displaying such objects, however, is only of relative usefulness if the position and orientation of the displayed objects cannot be readily controlled by the user. Although a prior art two-dimensional control device, such as a mouse, trackball or stylus, allows a user to control simple two dimensional movements of a three dimensional object, such a device generally does not allow the user to control movement of the object in a third degree of freedom, so as to simulate translational three dimensional movement, or in other degrees of freedom, to simulate complex three dimensional manipulations, such as yaw, pitch and roll.

To allow standard control devices to be used to control the movement of a three dimensional object relative to a third degree of freedom, standard control devices have been used in conjunction with keyboard commands or other physically input commands requiring the use of a second hand to control object translation along a third axis. For example, two dimensional mouse controllers, which control motion relative to a Y and Z axis, are often used in combination with the up and down arrow control keys on a keyboard to control translational movement of the object relative to the X-axis. This technique for manipulating a three dimensional object is generally unsatisfactory for the replication of natural-like control of the object because it requires the user to devote two hands to carrying out the manipulations (one to move the mouse and one to push the keyboard buttons). Hence, the object's motion along the third axis is generally difficult to control and coordinate, and no provision is made for allowing the user to separately control the yaw, pitch or roll of the object.

Trackballs and mice have also been modified to allow the user to simultaneously control movement of an object with respect to three translational axes. Evans, Tanner and Wein, "Tablet-Based Valuators that Provide One, Two, or Three Degrees of Freedom", *Computer Graphics*, Volume 15, Number 3, August 1981, page 91, describes a tablet-based three-axis trackball which emulates a standard two-axis trackball and includes a third sensor so that rotation can be simultaneously detected about each of three orthogonal axes. The trackball detects motion about the X-axis by rolling the ball up and down, the Y-axis by rolling the ball sideways, and the Z-axis by twisting the ball clockwise or counter-clockwise. Such devices do not provide the additional control which is required to rotate the object about any of its three translational axes. In addition, because all axes are simultaneously controlled by a single physical element (the ball), independent control of the object with respect to a single axis, without effecting the other axes, is difficult.

Control devices, however, have been created which provide some degree of independent control over the movement of three dimensional objects in relation to three axes and/or control over the rotation of such objects (yaw, pitch and roll) relative to those axes. One such device is a virtual controller, which uses a standard control device in conjunction with special software to remap the standard two dimensional motion of the control device to a different type of motion. For example, a virtual controller could be designed to take signals generated by the control device when making an in and out motion and to remap those signals to cause the object to change its yaw rotation. One problem with this type of device is that the user must set and/or change the desired mapping before taking and/or changing actions to create the desired effect. Another problem with this type of device is that the effect of a desired user action may often be difficult for the user to conceptualize, thereby making use of the device both awkward and unfriendly.

A second type of prior art controller, having a joystick or stick-shift type handgrip, is shown in Monge, U.S. Pat. No. 3,350,956, and King, U.S. Pat. No. 4,555,960. These references disclose a type of controller having four basic limitations which make its use as an input controller and object manipulator difficult. First, the device is bounded, meaning that the physical construction of the device limits the distance the handgrip can be moved in any one direction, thereby limiting the distance the object can likewise be moved. This limitation is undesirable because, in some computing simulations, it may be preferable to move the object in one particular direction for a longer period of time, or over a greater distance, than allowed by the boundaries of the device. Second, because all axes of motion are controlled by a single handgrip, it is difficult to move the object with respect to any one particular axis without also causing changes with respect to the other axes. Third, because the device is physically bounded, the position output signal of the device, which controls the position and orientation of the object, must be absolutely related to the physical position of the handgrip, which again limits the unbounded motion of the object. Fourth, because the handgrip of the device is controlled by movement of the user's entire arm or arms, precise control of the device, and therefore the object, may be difficult and in some situations fatiguing.

A third type of device involves the use of a sphere shaped control mounted on the end of a stick or suspended in the center of a weighted base. This type of device controls the position and orientation of the object on the screen by detecting very small changes in the orientation of the ball along with the degree of force exerted on the ball by the user. Since a continual force in one direction can be translated as a continual movement, this type of device resolves the bounding problem of the joystick device, but does nothing to eliminate interdependence of the position output signal on the physical movement of the controller, nor does it remove the likelihood of user arm fatigue.

A fourth type of device involves the use of a box with six or more rotating knobs corresponding to each type of movement to be controlled. Although this device resolves problems with bounding and interdependence, the direction of physical motion for all axes is rotary and therefore does not match the simulated motion of the object. In addition, the user must use two hands to simultaneously control more than one axis.

A fifth type of device, such as the 3SPACE Isotrak controller by the Polhemus Navigation Sciences Division of McDonnel Douglas Electronics Company, Colchester, Vt., uses a stationary source for generating a low-frequency magnetic field to a sensor which monitors changes in the magnetic field caused by the sensor's own movement. The sensor is small and lightweight and can be mounted on or within a wide variety of nonmetallic devices, such as a stylus or sphere, which can then be manipulated by the user in free-space to control the movement of an object on an associated computer's display. Because this type of device requires the user to hold the sensor in the air within the magnetic field while in use, it is heavily dependent on the agility and stamina of the user's arm to maintain control over the object's position and orientation. In addition, this type of device is bounded because it will only operate within the magnetic field of the source. The position output signal of such a device is, like a number of the other prior art devices, interdependent on the actual physical position of the sensor. Finally, because the device emits radio waves, it cannot be operated around large metallic objects, such as desks or filing cabinets, or other electronic devices which could be adversely affected by the transmitted magnetic field.

SUMMARY OF THE INVENTION

A preferred embodiment of the controller device of the present invention is comprised of a hand manipulable housing unit having an opening for the passage of a mouse ball, two motion detectors for detecting the movement of the mouse ball and converting that motion to output signals controlling the translational movement of an object on the display of a computer, and a finger operated conveyor belt or roller for controlling the translational motion of the object with respect to a third translational axis. All translation controls are operable to be physically moved in a direction which corresponds to the desired simulated direction of movement of the object on the display. The physical motion of each control is unbounded and the actual physical position of the housing unit is independent of the simulated position of the object on the display.

BRIEF DESCRIPTION OF THE DRAWING

FIG. 1 is a perspective view of a preferred embodiment of the controller device of the present invention;

FIG. 2 is a partially-broken top plan view of the controller device of FIG. 1;

FIG. 3 is partially-broken side elevational view of the controller device of FIGS. 1 and 2; and FIG. 4 is a perspective view of an alternative embodiment of the controller device of the present invention.

DETAILED DESCRIPTION OF PREFERRED EMBODIMENT

Referring now to FIGS. 1, 2 and 3, there is illustrated a hand controller, shown generally as 10, in accordance with the preferred embodiment of the present invention. The controller 10, having a main housing 12, operates to control the position and orientation of a computer generated image or object (not shown) on the display of the computer. The image is manipulated (moved or modified) by the controller 10 with respect to two orthogonal translational axes in a manner which is similar to the operation of a standard object control device, such as a mouse, the operation of which is well known in the art. The position of the object with respect to those two axes is controlled by the movement of a mouse ball 14, which is suspended within the housing 12 in a manner which is well known in the art, so that the user can freely roll the ball 14 over flat horizontal surfaces. The height of a Teflon ®-like slider 15 (illustrated in FIG. 3) attached to the bottom of the housing approximately corresponds to the drop of the mouse ball 14, so that the controller 10 remains in a level position over the horizontal surface upon which it is moved.

Within the housing 12 are two encoders, a Z-axis encoder shown generally as 16 for detecting "in" and "out" user directed motions of the controller 10, and a X-axis encoder shown generally as 18 for detecting "right" and "left" user directed motions of the controller 10. The Z-axis encoder 16 is comprised of a ball contact wheel 20 and wheel shaft 22 for driving an encoder 24 in response to movements of the ball 14. Detectors 26, generally comprised of an LED and a phototransistor located on opposite sides of the encoder 24, sense the movement of the ball 14 through rotation of the encoder 24 and output a quadrature signal to the computer, not shown, through the wiring harness 30, over four electrical wires 28. This quadrature signal corresponds to changes in the translational position of the housing 12 and ball 14 and is used by the computer to control the simulated position of the object with respect to a Z-axis of the display. Detectors 26 could also be electromagnetic devices or any of a number of other types of motion detectors.

So as to not unnecessarily obscure the present invention, some inconsequential electrical components and wiring, such as wires 28, are only partially illustrated. Also to be noted, when constructing a controller 10 in accordance with the present invention, it will generally be necessary to reduce the number of wires traveling from the controller 10 to the computer through the wiring harness 30 by time-multiplexing the quadrature signals from each set of detectors and the data signals from the other electrical components within the controller for transmission to the computer over a single data line. Hence, the only wires passing through the wiring harness 30 would be the power and ground lines for the various electrical components within the controller 10, a grounded shielding cable for reducing EMI transmissions, and a single data line. It would also be possible to eliminate the wiring harness 30 completely by providing the controller with its own resident power source and transmitting data signals from the controller 10 to the computer using wireless transmission technology, such as through means of infrared transmission.

Referring now back to FIG. 2, the X-axis encoder 18 is comprised of a ball contact wheel 32 and wheel shaft 34 for driving an encoder 36. Detectors 38 sense the movements of the ball 14 through rotation of the encoder 36 and output a quadrature signal to the computer. This quadrature signal corresponds to changes in the translational position of the housing 12 and ball 14 and is used by the computer to control the simulated position of the object with respect to a X-axis of the display. A third contact wheel 40 connected to a support shaft 42 and a support member 44 applies pressure against ball 14 to keep it in contact with wheels 20 and 32.

Another standardized feature of the controller of the present invention is the selection mechanism 50, which is comprised of a selection button 52 and a selection switch 54. The selection mechanism 50 allows the user to perform particular actions through use of the controller, such as selecting and dragging objects across the display screen of the computer, in a manner which is well understood by persons of ordinary skill in the art.

A conveyor mechanism 60 is utilized to control the "up" and "down" translations of the object with respect to a third translational axis, the Y-axis. Conveyor 60, which is housed within a tower 62 abutting the top of housing 12, is comprised of a conveyor belt 64 wrapped around a top shaft 66 and a bottom shaft 68. Conveyor belt 64 has a number of finger holes 74 formed within its broad side surfaces through which the user can insert a finger and thereby move the belt either "up" or "down". The surface of the belt 64 could also be knurled, or otherwise roughened, so that the user's finger can readily engage the belt 64 without his finger slipping across its surface. Moving the conveyor belt 64 rotates both shafts 66 and 68, thereby driving the conveyor encoder 70. The rotational motion of the conveyor encoder 70 is measured and converted to a quadrature signal by the detectors 72, in a manner similar to that of the detectors of translation encoders 16 and 18. This quadrature signal corresponds to changes in the translational position of the belt 64 and is used by the computer to control the simulated position of the object with respect to a Y-axis of the display.

A controller having three translational axis encoders similar to those described above would be effective for controlling a computer generated object with respect to at least three degrees of freedom. As stated above, two of the translational axes would be controlled in the familiar manner of a standard mouse controller. Whereas, the third degree of freedom would be controlled by the delicate motions of the user's finger on the conveyor belt 64, thereby allowing the user to simultaneously or independently control each of the axes of translation with a single hand.

It should be noted that the physical construction of the controller 10 makes it possible to directly map the physical motion of the controller with respect to each of the translational axes (up/down, left/right, and in/out) to the simulated motion of the object. For example, if a user desires to move the object to the left, he simply moves the controller 10 to the left, and if the user desires to move the object up, he simply moves his finger touching the belt 64 up. Hence, the user can easily conceptualize the simulated effect that each type of physical motion by the user with respect to the controller 10 or one of its associated control mechanisms will have on the position of the object on the display. In addition, the physical construction of the controller 10 resolves problems regarding physical bounding and interdependence between the actual position of the controller 10 and the simulated position of the object on the display.

In addition to the three dimensional control of the position of the object made possible by the present invention, additional degrees of freedom can likewise be controlled, thereby enhancing the user's ability to control both the object's position and orientation on the display.

Although the user's conceptualization of the effect of certain physical movements may be enhanced by the previously described physical construction of the controller 10 and its control mechanisms, such as conveyor 60, that physical construction is only preferable and is not a specific requirement of the present invention. Other constructions, such as that of the alternative embodiment depicted in FIG. 4, could likewise be utilized in accordance with the present invention.

The alternative embodiment of the controller 100 depicted in FIG. 4, although physically configured differently, is basically equipped in the same manner as controller 10, i.e., with a mouse ball 14 and three translational encoders, including encoders 16 and 18 (not shown). Controller 100, as well as controller 10, could also be equipped with optical detectors, instead of a ball 14 and encoders 16 and 18, to detect the translational position of the controller with respect to the X and Z-axes (a number of such techniques are well known in the art). Another alternative physical embodiment is to replace the conveyor belt 64 and tower 62 with a roller 102, as shown in FIG. 4, for performing the same type of controlling manipulations of the object. Controller 100 is also equipped with an extra selection button 104, in addition to selection button 52, to accommodate two different selection actions or to provide left or right-handed users with a convenient selection switch. It should be noted that although the selection switches in both embodiments are depicted as being mounted on the sides of the controller, these switches could be mounted at any position on the controller housing, such as on the controller housing 12.

In addition, all of the above controllers, or other types of controllers constructed in a manner consistent with the above descriptions, are still unbounded devices because each of the degrees of freedom may be ratcheted by the user. For example, to repeatedly move the object "down" with respect to the Y-axis, the user simply strokes down on the belt 64 a number of times, thereby causing an encoder to rotate in the appropriate direction and generate an output signal to the computer corresponding to the movements of the belt 64. Roller 102 and ball 14 could likewise be ratcheted.

Although the present invention has been described with reference to FIGS. 1-3 with emphasis on a preferred embodiment and FIG. 4 with respect to an alternative embodiment, it should be understood that the figures are for illustration only and should not be taken as limitations upon the invention. It is contemplated that many changes and modifications may be made to the present invention by one of ordinary skill in the art, after having read the above description, without departing from the spirit and scope of the invention as disclosed above.

I claim:

1. A device for providing signals indicative of an object's location on a display, comprising:

a housing operative to be manipulated by a user;

a first translation position indicating means affixed to said housing for producing a first signal indicative of a first position of said object on said display with respect to a first translational axis;

a second translation position indicating means affixed to said housing for producing a second signal indicative of a second position of said object on said display with respect to a second translational axis; and a third translation position indicating means affixed to said housing, including a bidirectional controller operated by one or more fingers fingers of said user, for producing a third signal indicative of a third position of said object on said display with respect to a third translational axis, said bidirectional controller including a belt operative to be bidirectionally moved by said fingers and having means or detecting bidirectional movement of said belt and converting the detected movement of said belt to said third signal, said belt being affixed to said housing in such a manner that said user can operate said belt equally as well when said device is stationary as when said device is being moved across a surface by said user;

whereby a movement of said device over a surface results in said first and second positions of said object being defined on said display, and whereby a movement of said bidirectional controller results in said third position of said object being defined on said display.

2. The device as recited in claim 1, wherein said belt has two broad side surfaces having a plurality of fingertip sized holes formed therein through which said fingers can be inserted.

3. The device as recited in claim 1, wherein said belt has a rough outer surface for engaging said fingers.

4. The device as recited in claim 1, wherein the bidirectional movement of said belt is unbounded.

5. The device as recited in claim 1, wherein said housing further includes a belt enclosure affixed to said housing for extending a portion of said belt away from said housing, said enclosure having an aperture through which said fingers can be inserted to engage said belt.

6. The device as recited in claim 1, wherein said belt is further affixed to said housing in such a manner that the physical direction of motion of said fingers operating said belt substantially corresponds to the direction of motion of said object with respect to said third translational axis.

7. The device as recited in claim 6, wherein said housing further includes a belt enclosure affixed to said housing for extending a portion of said belt away from said housing, said enclosure having an aperture through which said fingers can be inserted to engage said belt.

8. An apparatus for generating signals indicative of the three-dimensional position of an object, comprising:
an external housing;
a first translation position indicating means mounted to said housing for producing a first signal indicative of a first position of said object with respect to a first axis;
a second translation position indicating means mounted to said housing for producing a second signal indicative of a second position of said object with respect to a second axis; and
a third translation position indicating means mounted to said housing, including a bidirectional controller, for producing a third signal indicative of a third position of said object with respect to a third axis, said bidirectional controller including a roller operative to be bidirectionally moved by said fingers and having means for detecting bidirectional movement of said roller and converting the detected movement of said roller to said third signal, said roller being affixed to said housing in such a manner that said user can operate said roller equally as well when said device is stationary as when said device is being moved across a surface by said user;

whereby movement of said apparatus over a surface results in said first and second positions of said object being defined, and whereby movement of said bidirectional controller results in said third position of said object being defined.

9. The device as recited in claim 8, wherein said roller has a rough outer surface for engaging said fingers.

10. The device as recited in claim 8, wherein said housing further includes a roller enclosure affixed to said housing for extending a portion of said roller away from said housing, said enclosure having an aperture through which said fingers can be inserted to engage said roller.

11. The device as recited in claim 10, wherein said roller is further affixed within said enclosure in such a manner that the physical direction of motion of said fingers on said roller substantially corresponds to the direction of motion of said object with respect to said third axis.

12. The device as recited in claim 8, wherein said roller is further operative to be continuously moved in a direction by two fingers of said users in such a manner so as to continuously change the definition of said third position for said object.

* * * * *